Figure 1:
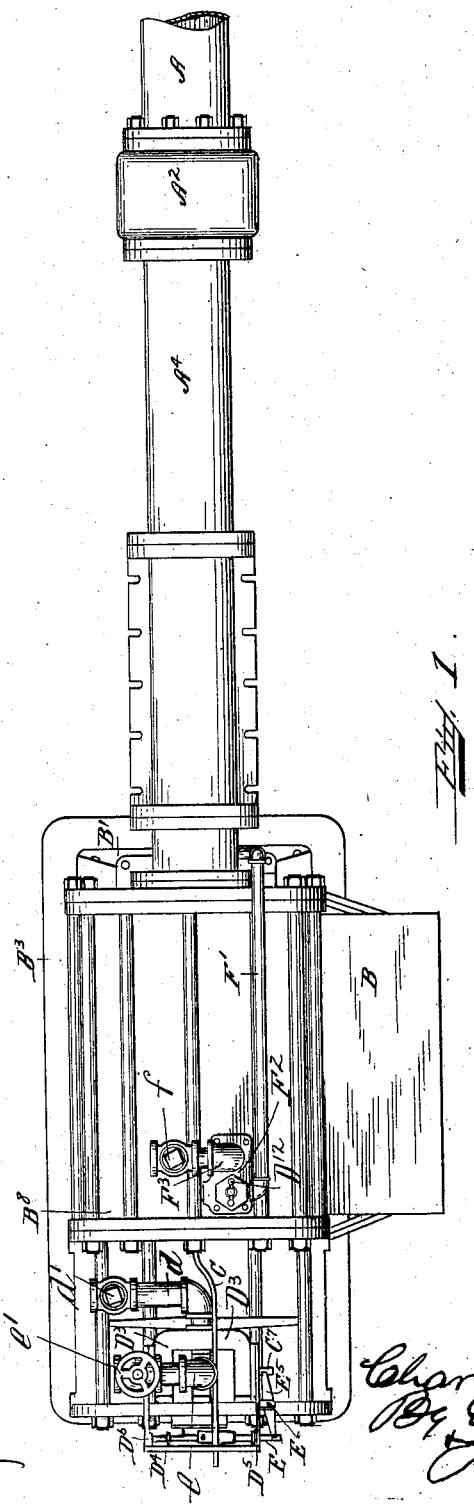

No. 760,659. PATENTED MAY 24, 1904.
C. F. STODDARD.
PNEUMATIC DESPATCH APPARATUS.
APPLICATION FILED OCT. 5, 1903.
NO MODEL. 9 SHEETS—SHEET 1.

No. 760,659. PATENTED MAY 24, 1904.
C. F. STODDARD.
PNEUMATIC DESPATCH APPARATUS.
APPLICATION FILED OCT. 5, 1903.
NO MODEL. 9 SHEETS—SHEET 3.

No. 760,659. PATENTED MAY 24, 1904.
C. F. STODDARD.
PNEUMATIC DESPATCH APPARATUS.
APPLICATION FILED OCT. 5, 1903.
NO MODEL. 9 SHEETS—SHEET 4.
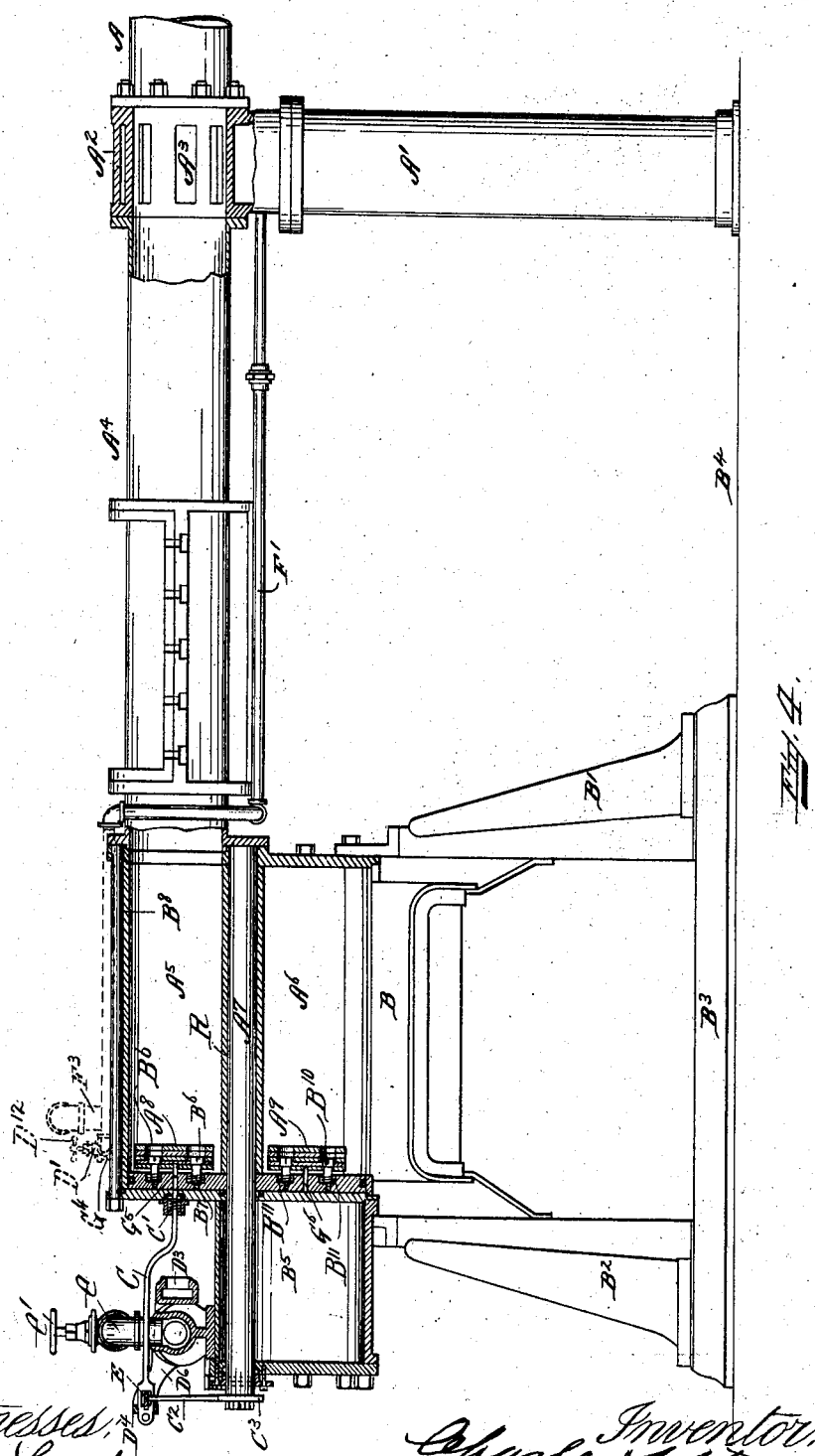

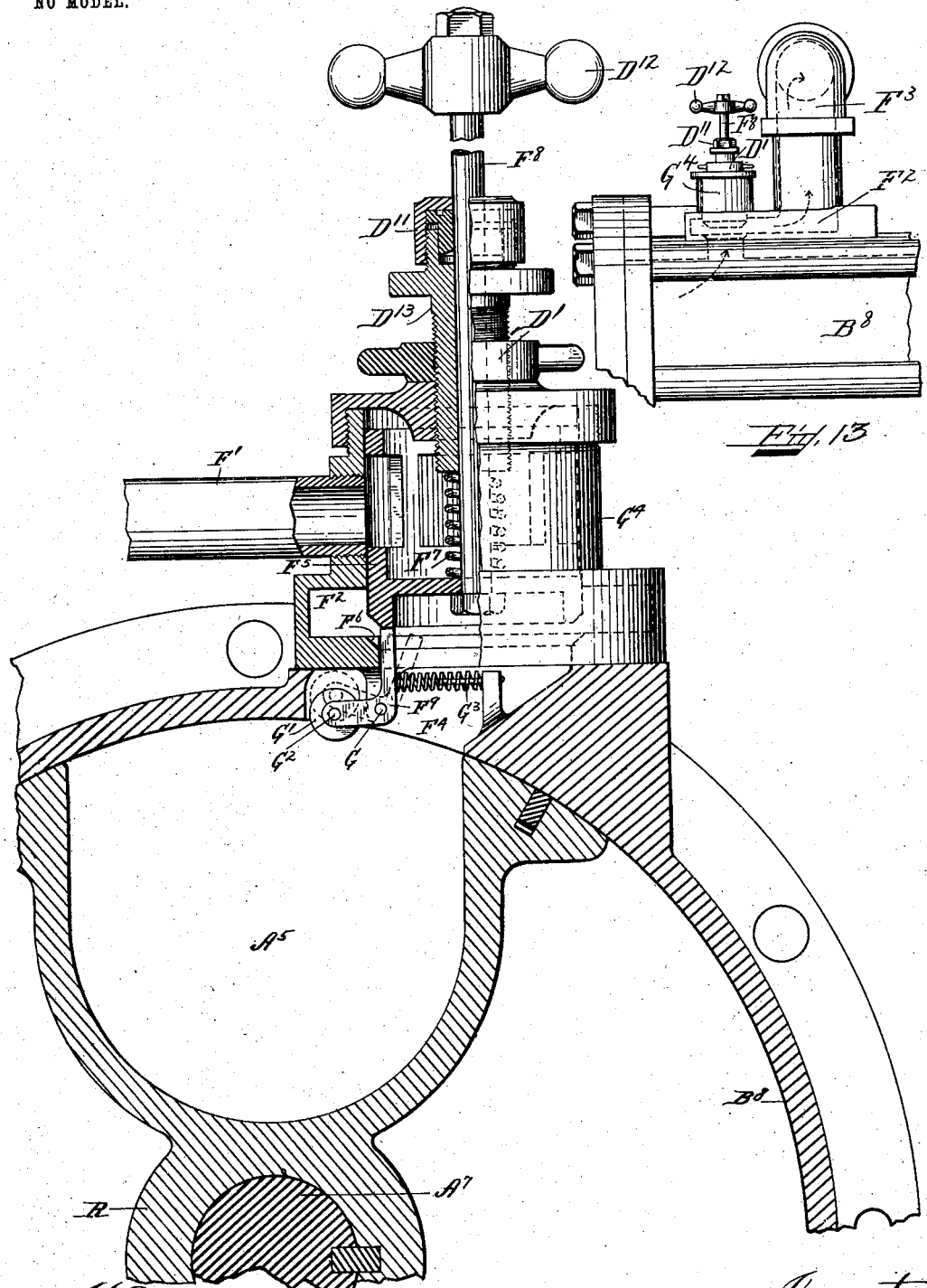

No. 760,659. PATENTED MAY 24, 1904.
C. F. STODDARD.
PNEUMATIC DESPATCH APPARATUS.
APPLICATION FILED OCT. 5, 1903.
NO MODEL. 9 SHEETS—SHEET 6.
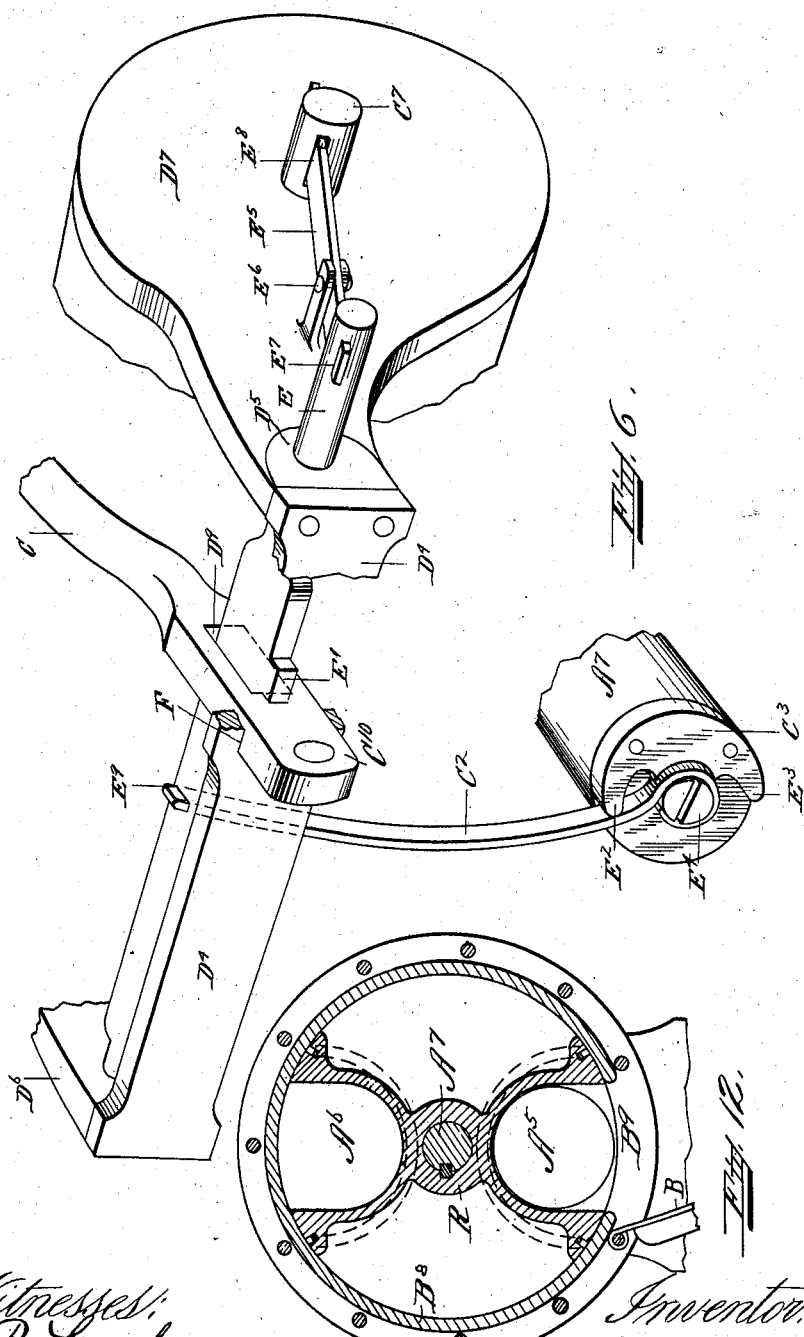

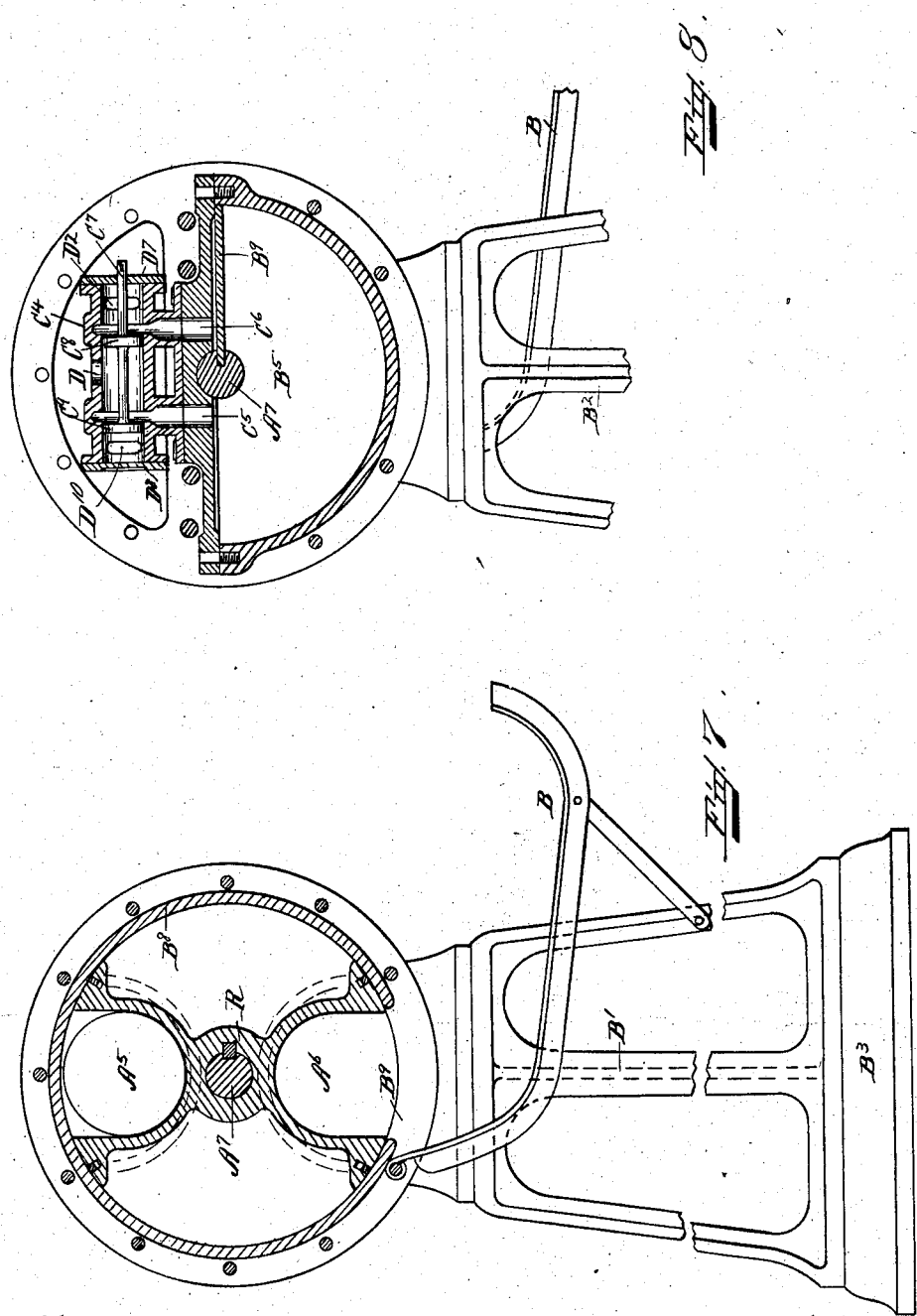

No. 760,659. PATENTED MAY 24, 1904.
C. F. STODDARD.
PNEUMATIC DESPATCH APPARATUS.
APPLICATION FILED OCT. 5, 1903.
NO MODEL. 9 SHEETS—SHEET 8.
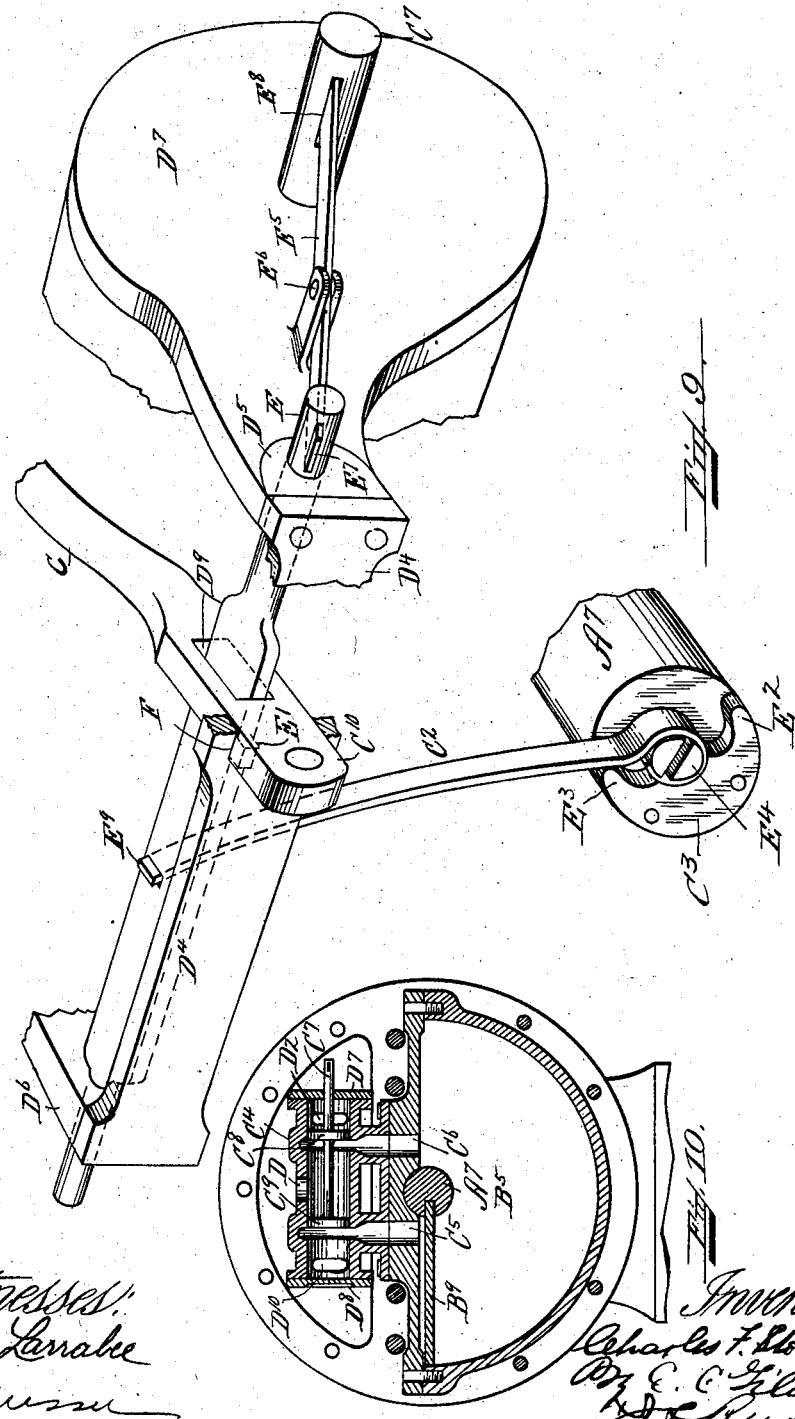

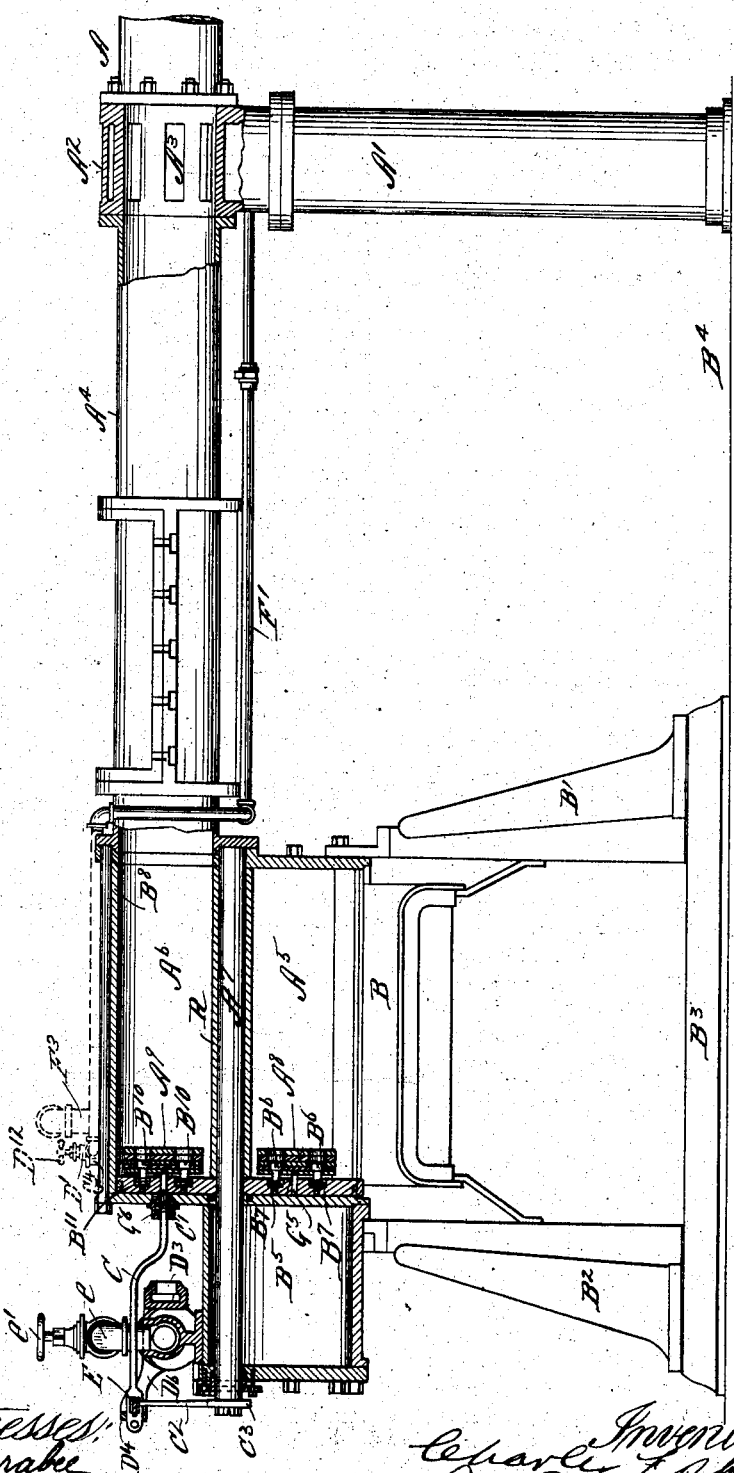

No. 760,659. Patented May 24, 1904.

UNITED STATES PATENT OFFICE.

CHARLES F. STODDARD, OF BOSTON, MASSACHUSETTS, ASSIGNOR TO AMERICAN PNEUMATIC SERVICE COMPANY, OF DOVER, DELAWARE, A CORPORATION OF DELAWARE.

PNEUMATIC-DESPATCH APPARATUS.

SPECIFICATION forming part of Letters Patent No. 760,659, dated May 24, 1904.

Application filed October 5, 1903. Serial No. 175,833. (No model.)

*To all whom it may concern:*

Be it known that I, CHARLES F. STODDARD, of Boston, in the county of Suffolk and State of Massachusetts, have invented certain new and useful Improvements in Pneumatic-Despatch Apparatus, of which the following is a specification.

My invention relates to improvements in pneumatic-despatch apparatus, and especially to receiving-terminals for removing the carriers from the line under pressure.

The object of my invention is to produce an apparatus simple in construction and efficient in operation, especially as to the delivery of the carriers from the receiver.

As shown in the drawings, the apparatus consists of a chamber in which a carrier is stopped by compressing the air in front of it, and at the end of the chamber is a revolving drum with two chambers, which when the drum is revolved are brought into line with the compression-chamber, so that the carriers may enter one of the chambers of the revolving drum. The movement of the drum is controlled by means of a piston which moves in a cylinder. The revolving drum is within the cylinder, which is open at the lower side to allow the carriers to drop out when they reach this point onto a suitable table. At the back of each of these chambers in the drum is a bumper, which is provided with a stud running through the back of the drum. When the drum-chamber is in line with the compression-chamber, this stud is in line with a plunger-rod which trips a valve controlling the supply and exhaust to the cylinder which operates the revolving drum, so that when the carrier strikes the bumper the blow is communicated to the rod and the valve turned to the right position to operate the machine. The cylinder which incloses the revolving drum is provided with a relief-valve in such a position as to relieve the pressure in front of the carrier after it enters the compression-chamber, so that the carrier is moved forward into a chamber of the revolving drum and strikes the bumper, which causes the drum-revolving controlling-valve to work, thereby moving the revolving drum one-half a revolution into such a position that the carrier will drop out through the opening in the bottom of the cylinder onto a suitable receiving-table.

My invention consists of certain novel features hereinafter described, and particularly pointed out in the claims.

Figure 2:
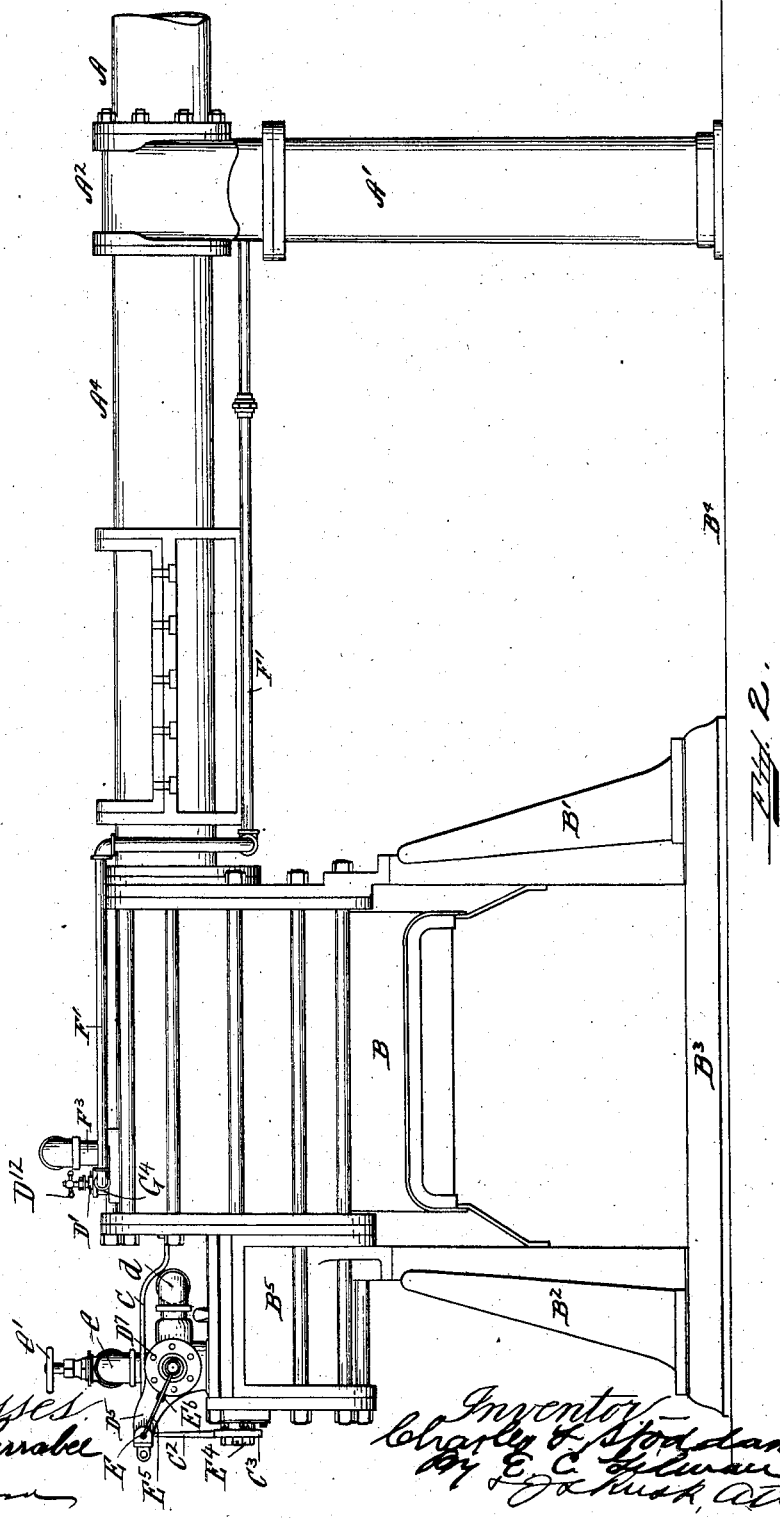
Figure 3:
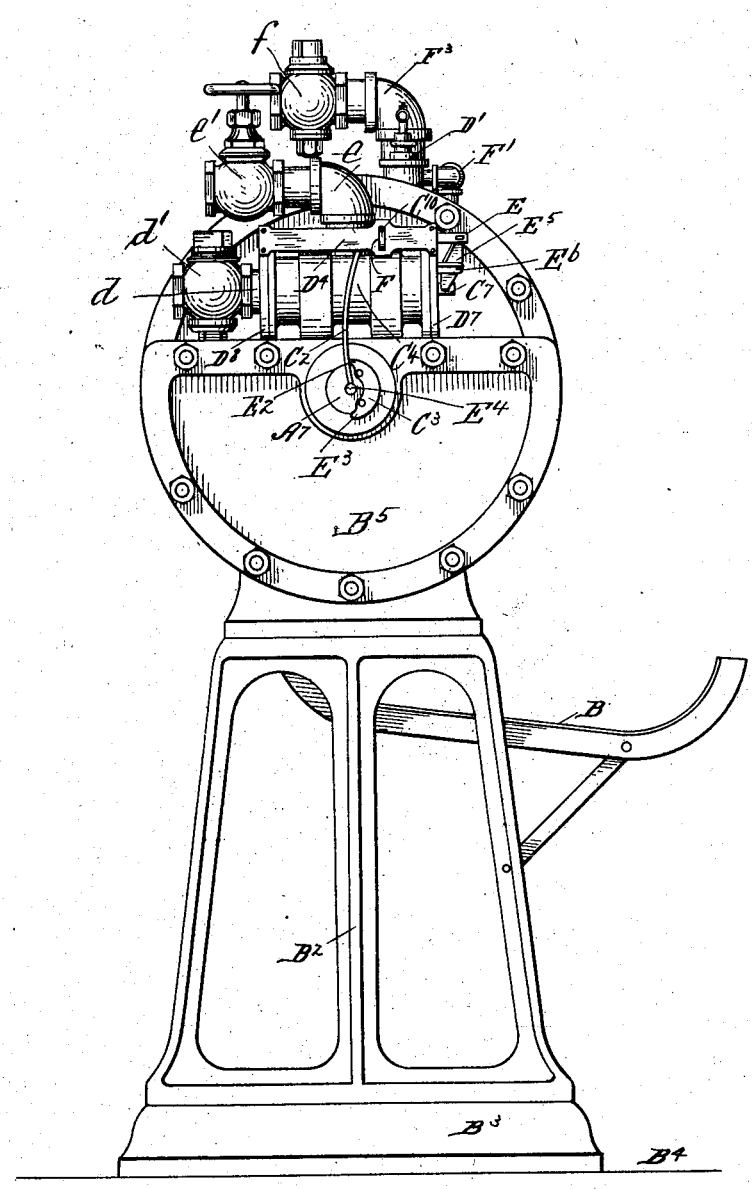

In the accompanying drawings, which illustrate a construction embodying my invention, Figure 1 is a plan view of the terminal. Fig. 2 is a side elevation. Fig. 3 is an end elevation. Fig. 4 is a longitudinal section through the terminal with parts in full lines. Fig. 5 is a section through the revolving drum with communicating parts. Fig. 6 shows details of the trip mechanism operated by the carrier and hereinafter described. Fig. 7 is a vertical cross-section through the revolving drum and showing the table onto which the carriers are discharged. Fig. 8 is a cross-section through the cylinder and its piston which operates the drum, and through the air-valve controlling the movement of said piston. Fig. 9 shows details of trip mechanism operated by the carrier similar to Fig. 6 with the parts in the opposite position. Fig. 10 is a cross-sectional view similar to Fig. 8 with the parts in the opposite position. Fig. 11 is a longitudinal section through the terminal with the revolving drum and its chambers in the opposite position to that shown in Fig. 4. Fig. 12 is a vertical cross-section through the revolving drum and showing the parts in the opposite position to that shown in Fig. 7. Fig. 13 is a detail view hereinafter explained.

Like letters of reference refer to like parts throughout the several views.

The carrier enters the compression-chamber $A^4$ from the transmission-tube A through the grated T $A^2$, which is supplied with openings $A^3$, and the air from the transmission-tube A passes out through the pipe $A'$. When the pressure of the air in front of the carrier in the compression-chamber $A^4$ is raised above that behind the carrier, it is communicated through the revolving chamber $A^5$ to the under side of the relief-valve $F^5$, Fig. 5, in the casing $G^4$ through the port $F^4$. The relief-valve $F^5$ is balanced when it is closed on its seat $F^6$ by the line-pressure on the under side coming up through the port $F^4$ and the line-pressure on the upper side coming in through the pipe $F'$ and held down in place by the spring $F^7$. The valve-stem $F^8$ is stuffed by the stuffing-box $D^{11}$, and the tension of the spring $F^7$ is adjusted by the screw $D^{13}$, which is held in its adjusted position from moving by the catch-nut $D'$. $D^{12}$ is a suitable handle on the valve-stem $F^8$, so that the relief-valve $F^5$ may be raised by hand at any time. When the relief-valve $F^5$ is raised from its seat $F^6$, the bell-crank trip $F^9$ moves from its dotted position to under it, (full lines,) so as to hold it up, by means of the spring $G^3$, this trip being pivoted at the point G and having on its lower end a suitable friction-roller $G'$, pivoted on the shaft $G^2$. The chamber $F^2$ is now in communication with the revolving chamber $A^5$ and receives the air compressed by the carrier and is in communication with the atmosphere through the pipe $F^3$, having a suitable adjustable valve $f$, Figs. 1, 3, 13, so that when the relief-valve $F^5$ is raised into the position shown in Fig. 5 the pressure in front of the carrier is relieved through the chamber $F^2$ and pipe $F^3$, and the pressure back of the carrier forces it ahead until it strikes the bumper $A^8$, Fig. 4, which is hung on the screws $B^6$ and is provided at its back with the stud $G^5$.

When the terminal is in its normal position, Fig. 4, the plunger-rod C abuts against the stud $G^5$ and is held in its normal position by the spring $C'$. When a carrier strikes the bumper $A^8$, it forces it ahead against the springs $B^7$, so that the plunger-rod moves ahead the same distance, which is enough to trip the rod E, (shown in Figs. 1, 4, and 6,) thereby allowing the spring $C^2$, connected to the rod E at $E^9$, to throw said rod E into the opposite position from that shown in said figure. As the plunger-rod C is moved, as just described, by the stud $G^5$ its outer end $C^{10}$ moves through the opening F on the fixed plate $D^4$, which movement allows the lug $E'$ to pass through the opening $D^9$ in the rod C under the tension of the spring $C^2$, as shown in Fig. 9, and upon the return of the rod C to its normal position by the spring $C'$ the lug $E'$ is caught on the opposite side of said rod C and holds the rod E in the position shown in Fig. 9.

The rocker $E^5$, Figs. 1, 2, 6, and 9, pivoted at $E^6$, passes through the slot $E^7$ in the rod E and at the opposite end through the slot $E^8$ in the piston-rod $C^7$ of the air-controlling valve $C^4$, Figs. 8 and 10. When the rod E, supported in the extensions $D^5$ $D^6$ on the heads $D^7$ $D^8$ of the said valve $C^4$, moves to the opposite position from that shown in Fig. 6, just described, to that shown in Fig. 9, the motion is communicated through the rocker $E^5$ to the piston-rod $C^7$, which moves the pistons $C^8$ $C^9$ from the position shown in Fig. 8 to that shown in Fig. 10, thereby reversing the supply and exhaust through the ports $C^5$ $C^6$ of the valve $C^4$, so that the compressed air from a suitable source entering the port D through the pipe $e$, controlled by a suitable globe-valve $e'$, passes down through the port $C^6$ and moves the piston $B^9$, fast on the shaft $A^7$, from its position in the cylinder $B^5$, Fig. 8, to that shown in Fig. 10 and the pressure in the cylinder $B^5$ exhausts through the port $C^5$ through the opening $D^{10}$ and passage $D^3$ through the pipe $d$, controlled by a suitable valve $d'$. The piston $B^9$ being, as stated, securely fastened to the shaft $A^7$, as is also the revolving drum R, moves around to the opposite side of the cylinder $B^5$, Fig. 10, and the drum R also moves around, so that the chamber $A^6$ takes the place of the chamber $A^5$, Figs. 11 and 12. The chamber $A^5$ is thereby brought into such a position that the carrier therein drops down onto the table B, Fig. 7. The operation above described brings the chamber $A^6$ around into alinement with the compression-chamber $A^4$ and in position to receive another carrier.

With the parts in the position shown in Fig. 11, with the chamber $A^6$ in alinement with the compression-chamber $A^4$, the stud $G^6$ contacts with the plunger-rod C, as shown, and upon the carrier entering the chamber $A^6$ striking the bumper $A^9$, hung on the screws $B^{10}$, moves said bumper $A^9$ ahead against the springs $B^{11}$, whereupon the stud $G^6$ actuates the rod C against the spring $C'$ and moves said rod outwardly from the position shown in Fig. 9, so that the spring $C^2$ moves outwardly the rod E, with its lug $E'$, through the opening $D^9$ from the position shown in Fig. 9 to that shown in Fig. 6, which movement of the rod E and spring $C^2$ moves the rocker $E^5$ so as to move inwardly the piston-rod $C^7$, bringing the pistons $C^8$ $C^9$ from the position shown in Fig. 10 to that shown in Fig. 8. As the rod C returns to its normal position by means of the spring $C'$ the lug $E'$ is caught on the right-hand side of the rod C, as shown in Fig. 6, and held in this position by the tension of the spring $C^2$ until the next operation. In this position of the parts the air-pressure through the port D presses down through the port $C^5$ and moves the piston $B^9$ around into the position shown in Fig. 8, which brings the chambers $A^5$ $A^6$ around into their former positions, Figs. 4 and 7, with the chamber $A^6$ in position to discharge a carrier onto the table B and with the chamber $A^5$ in position to receive another carrier. During this movement of the piston $B^9$ the pressure in the cylinder $B^5$ exhausts through the port $C^6$ to the opening $D^2$ into the passage $D^3$ and out through the pipe $d$ to the atmosphere.

The spring $C^2$ is held under tension when the parts are in the position shown in Fig. 4 by the point $E^2$ of the tappet $C^3$, fixed on the shaft $A^7$, Fig. 6, and when the parts are in the position shown in Fig. 11 the spring $C^2$ is held under tension by the point $E^3$ of the tappet $C^3$, Fig. 9. This spring $C^2$ is held fixed on the shaft $A^7$ at the lower end by the screw $E^4$.

It will be understood that when a carrier strikes the bumper $A^8$ or $A^9$ said bumper and carrier slightly return under the influence of the springs $B^7$ or $B^{11}$, thereby withdrawing the studs $G^5$ or $G^6$, so that the bumpers $A^5$ or $A^6$ are free to turn in the manner hereinbefore described.

It will be understood that as the movable receiver turns from the position shown in Fig. 4 to that shown in Fig. 11 the upper left-hand end of the chamber $A^5$, which is turning toward the left, strikes the roller $G'$ and releases the trip, which moves into the position shown in dotted lines, Fig. 5, thereby allowing the relief-valve $F^5$ to close onto its seat $F^6$ in a position to be operated again in a similar manner by a carrier entering the chamber $A^6$, which in this movement of the receiver is brought to the top, as shown in Fig. 11.

I do not limit myself to the arrangement and construction shown, as the same may be varied without departing from the spirit of my invention.

Having thus described the nature of my invention and set forth a construction embodying the same, what I claim as new, and desire to secure by Letters Patent of the United States, is—

1. In a pneumatic-despatch apparatus, a transmission-tube, a receiver for the carriers consisting of receiving-tubes, mechanism for moving one of said tubes out of alinement with the transmission-tube for the discharge of a carrier and for moving another tube into alinement with the transmission-tube to receive a carrier from said transmission-tube, an air-supply for operating said receiver-moving mechanism, mechanism located in the path of the traveling carrier and operated thereby to admit air to said receiver-moving mechanism for operating the same, and a table onto which a carrier is discharged by gravity.

2. In a pneumatic-despatch apparatus, a transmission-tube for the carriers, a movable receiver, a shaft on which said receiver is mounted, a source of air-pressure, a cylinder having a piston directly connected to said shaft, a valve controlling the flow of air-pressure into said cylinder to operate the piston therein, mechanism located in the path of the traveling carrier and operated thereby to actuate said valve to admit air to said cylinder to move the receiver from alinement with the transmission-tube for the discharge of a carrier, an outlet from said receiver for the escape of air compressed by the traveling carrier, and a relief-valve actuated by the air compressed by the traveling carrier and adapted to open to allow the escape of said compressed air from the receiver to the atmosphere.

3. In a pneumatic-despatch apparatus, a transmission-tube for the carriers, a movable receiver, a shaft on which said receiver is mounted, a source of air-pressure, a cylinder having a piston directly connected to said shaft, a valve controlling the flow of air-pressure into said cylinder to operate the piston therein, mechanism located in the path of the traveling carrier and operated thereby to actuate said valve to admit air to said cylinder to move the receiver from alinement with the transmission-tube for the discharge of a carrier, an outlet from said receiver for the escape of air compressed by the traveling carrier, a relief-valve actuated by the air compressed by the traveling carrier and adapted to open to allow the escape of said compressed air from the receiver to the atmosphere, a trip for holding said valve in its open position and adapted to be operated by the movement of the receiver to release said relief-valve to allow it to close, and a pipe connection leading the line-pressure to the top of said valve for closing the same.

4. In a pneumatic-despatch apparatus, a transmission-tube, a receiver for the carriers, means for cushioning the carrier by the air compressed ahead of the traveling carrier, a relief-valve for releasing the air compressed ahead of the carrier so that the pressure behind the carrier will move it to the end of the receiver, a trip for holding said relief-valve in its open position and operated by the movement of the receiver to release said trip to allow said valve to close, and a pipe connection leading the line-pressure to the top of said valve for closing the same.

5. In a pneumatic-despatch apparatus, a transmission-tube, a receiver for the carriers, means for cushioning the carriers by means of air compressed ahead of the traveling carrier, a relief-valve for releasing the air compressed ahead of the carrier so that the pressure behind the carrier will move it to the end of the receiver, a trip for holding said relief-valve in its open position and operated by the movement of the receiver to release said trip to allow said valve to close, a pipe connection leading the line-pressure to the top of said valve for closing the same, mechanism for moving said receiver out of alinement with the transmission-tube for the discharge of the carrier, an air-supply for operating said mechanism, and mechanism located in the path of the traveling carrier and operated thereby to actuate said mechanism by air from said air-supply for moving the receiver for the discharge of the carrier.

6. In a pneumatic-despatch apparatus, a transmission-tube, a receiver for the carriers, means for cushioning a carrier by the air compressed ahead of the traveling carrier, a relief-valve for releasing the air compressed ahead of the carrier so that the pressure behind the carrier will move it to the end of the receiver, a trip for holding said relief-valve in its open position to release said trip to allow said valve to close, a pipe connection leading the line-pressure to the top of said valve for closing the same, a movable receiver, an air-supply, a cylinder having a piston connected to said receiver, a valve controlling the flow of air-pressure into said cylinder to operate the piston therein, and mechanism located in the path of the traveling carrier and operated thereby to actuate said valve to admit air to said cylinder to remove the receiver from alinement with the transmission-tube for the discharge of the carrier.

In testimony whereof I have signed my name to this specification, in the presence of two subscribing witnesses, this 1st day of October, A. D. 1903.

CHARLES F. STODDARD.

Witnesses:
A. R. LARRABEE,
A. L. MESSER.